United States Patent [19]
Lieser

[11] 3,797,525
[45] Mar. 19, 1974

[54] PILOT VALVE
[75] Inventor: Mathias J. Lieser, Chicago, Ill.
[73] Assignee: Stanray Corporation, Chicago, Ill.
[22] Filed: Apr. 10, 1972
[21] Appl. No.: 242,527

[52] U.S. Cl. ............................................. 137/625.6
[51] Int. Cl. ............................................. F16k 11/00
[58] Field of Search ....... 137/625.6, 625.66; 251/14

[56] References Cited
UNITED STATES PATENTS

| 2,722,234 | 11/1955 | Macgeorge et al. | 137/625.6 |
| 3,113,590 | 12/1963 | Olson | 137/625.6 |
| 3,002,532 | 10/1961 | Carlson | 137/625.66 |
| 2,935,972 | 5/1960 | Hard or Segerstad | 137/625.66 UX |
| 2,913,005 | 11/1959 | Grant et al. | 137/625.6 |
| 3,083,730 | 4/1963 | Hay | 137/625.6 |

Primary Examiner—Alan Cohan
Assistant Examiner—Robert J. Miller
Attorney, Agent, or Firm—Olson, Trexler, Wolters & Bushnell

[57] ABSTRACT

A pilot valve construction is illustrated having a single inlet port and first and second outlet ports selectively to be in fluid communication with the inlet. A cylindrical bore passes through the valve body and a cylindrical slide element having enlarged diameter portions, acting as sealing walls, is slidable within the cylindrical bore so that fluid flow can pass through a shuttle chamber formed by two of the enlarged diameter portions. The slide element has one end thereof operatively associated with a fluid flow control chamber which receives a fluid pressure from the inlet port through a bleed passage. This causes the slide element to be shifted to a predetermined position. Upon venting or otherwise changing the pressure within the control chamber, the slide element will shift to a second position thereby changing the fluid flow from the first outlet port to a second outlet port. Fluid flow control means is associated with the control chamber to vary the pressure therein to cause movement of the slide element.

2 Claims, 10 Drawing Figures

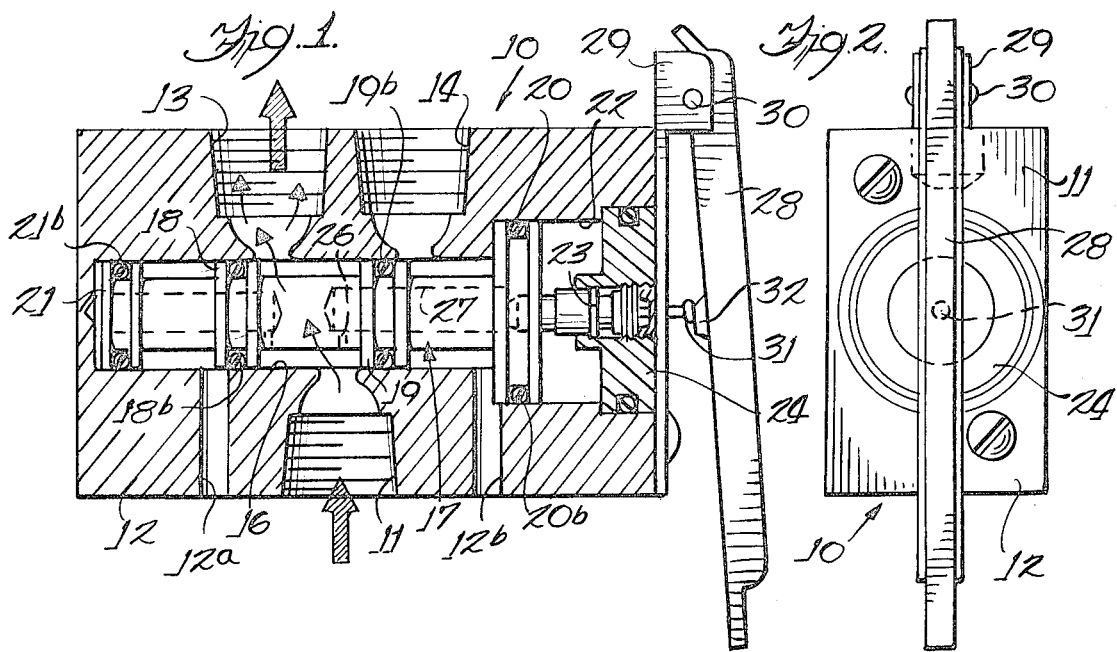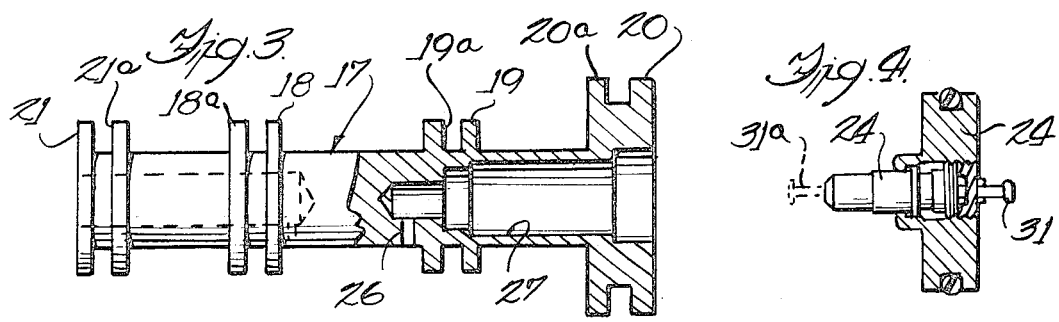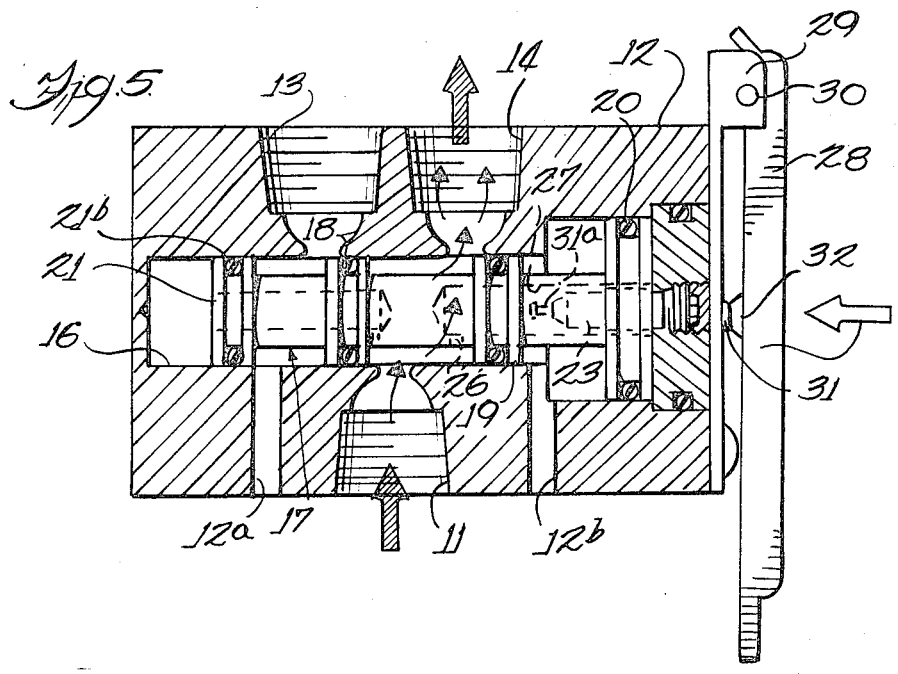

PILOT VALVE

BACKGROUND OF THE INVENTION

This invention relates generally to pilot valves, and more particularly to pilot valves for controlling fluid flow of either air or hydraulic fluid from a single inlet to either one of a pair of outlet ports in a selective manner.

When controlling high pressure pneumatic or hydraulic systems or moderate pressured large volume fluid flow pneumatic or hydraulic control systems, it is advantageous to utilize relatively small pilot valves at the control end of such systems. By utilizing small pilot valves, the size and complexity of a control panel is greatly reduced. Therefore, large equipment, at a remote location, can be operated by a person actuating a relatively small and simple control valve device. Also, maintenance on the smaller control valves is less costly.

However, pilot valves heretofore utilized in such systems have been relatively complicated and expensive to manufacture. Such pilot valves many times incorporate spring biasing of a piston element so that operating pressure is required to overcome a spring bias. This would cause problems in the fluid control system in that if the pilot valve is actuated so as to control fluid in a manner where the biasing spring or springs are compressed, failure of air or hydraulic pressure would automatically cause the pilot valve to change its state back to its initial condition. This is undesirable because upon reapplying of air or hydraulic pressure the pilot valve will actuate a different device.

SUMMARY OF THE INVENTION

Accordingly, it is an object of this invention to provide an improved and simplified pilot valve for pneumatic or hydraulic control systems which is simple and efficient in operation and inexpensive to manufacture.

Another object of this invention is to provide a pilot valve wherein the control piston element of the valve is free of spring biasing and will not change positions should the operating pressure be lost.

A still further object of this invention is to provide a pilot valve of the type which has a control chamber for changing pressure at one end of a slide piston by venting the pressure in the control chamber and further including cutoff means which prevents further venting of the control chamber once the piston is moved to its new position.

Briefly, the pilot valve of this invention includes a valve body having an inlet port and first and second outlet ports selectively to be in fluid communication with the inlet port, this depending on the position of a slide element within the valve body. At at least one end of the slide element there is a control chamber which receives fluid pressure either from the inlet port through a bleed passage or from an external source. The end of the slide element in contact with the control chamber may have a larger diameter than the other piston forming portions thereof. Therefore, with the same pressure on opposite sides of different diameter pistons, the slide element will automatically be urged to a first neutral position upon application of pressure at the inlet port and with the control chamber sealed. Movement of the slide element is accomplished by changing the pressure in the control chamber, either by venting the pressure in the control chamber to atmosphere, or by changing pressure therein from an external source. Therefore, fluid flow from the inlet port is directed by means of a shuttle chamber formed on the slide element to the second outlet port. To vent the control chamber a tire valve type of pressure release mechanism may be used, or this may be replaced with an electrically operated solenoid plunger positioned over an aperture formed through the end wall of the control chamber. If operating pressure is lost for one reason or another, the slide element will not move back to its neutral position. In one embodiment of the invention a back pressure release piston is positioned in one end of the slide element and automatically becomes dislodged due to back pressure at the second outlet port of the pilot valve should the pilot pressure in the control chamber be lost so that the slide element will not change its position.

Many other objects, features and advantages of this invention will become more fully apparent from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is an elevational sectional view showing one form of pilot valve constructed in accordance with this invention;

FIG. 2 is an end view of the pilot valve of FIG. 1;

FIG. 3 is an enlarged partially sectional view of the slide element of the pilot valve of FIG. 1;

FIG. 4 is an elevational sectional view showing a tire valve in the end cap of the control chamber of FIG. 1;

FIG. 5 is an elevational sectional view similar to FIG. 1 but with the slide element shown in actuated position;

DETAILED DESCRIPTION OF THE ILLUSTRATED EMBODIMENTS

Figure 6:
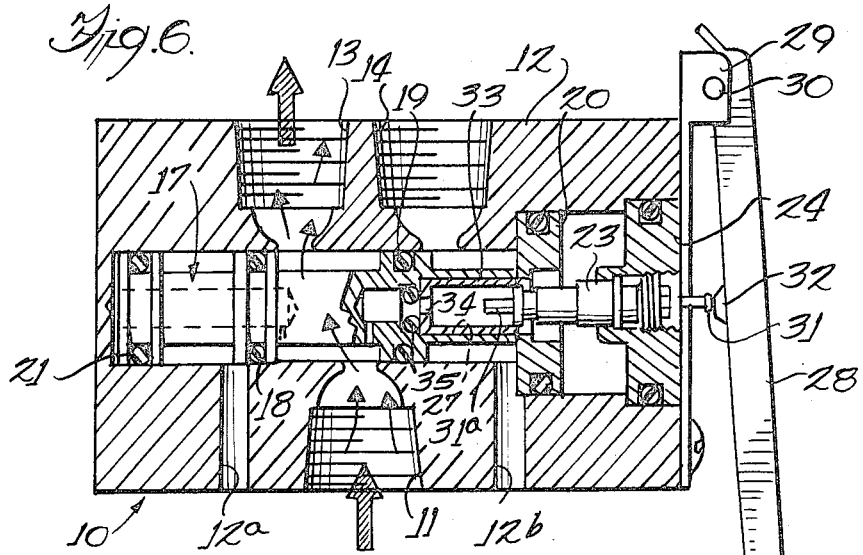
FIG. 6 illustrates a modified form of the pilot valve of FIG. 1.

Referring now to FIG. 1 there is seen a pilot valve constructed in accordance with the principles of this invention and designated generally by reference numeral 10. The pilot valve 10 has an inlet port 11 formed in a valve body 12, here illustrated as rectangular in the cross section. The inlet port 12 is selectively placed in fluid communication with either one of a pair of outlet ports 13 or 14 through a shuttle chamber or passage formed within a cylindrical bore 16. The shuttle passage is formed by the central portion of a slide element 17 which has first and second enlarged diameter portions 18 and 19, respectively, forming piston-like members which move axially within the cylindrical bore 16 to shift the shuttle chamber formed thereby between one or the other of the outlet ports. A third enlarged diameter portion 20 is formed at one end of the slide element 17, here it being of greater diameter than the first and second enlarged diameter portions 18 and 19.

The enlarged diameter portion 20 has a greater surface area than do the diameter portions 18 and 19 and therefore equal pressure on either side of the piston-like elements will urge the slide element 17 to the left, as seen in FIG. 1. The other end of the slide element 17 has an enlarged diameter portion 21 which, together with the enlarged diameter portion 18 forms a bleed chamber to atmosphere through a port 12a of the valve body 12. A second port 12b is formed in the valve body and is in fluid communication with the outlet 14 by means of the reduced diameter portion between the pistons 19 and 20. Each of the enlarged diameter portions forming the piston-like members have grooves 18a, 19a, 20a and 21a, as best seen in FIG. 3, to receive therein correspondingly sized O-rings 18b, 19b, 20b and 21b which serve as seal elements between the respective chambers.

A control chamber 22 in this instance is formed at the end of the valve body receiving the enlarged diameter portion 20 and includes a tire valve 23 threadedly secured into an end cap 24. The control chamber 22 is in fluid communication with the inlet port 11 through a bleed port 26 which passes transversely through the slide element 17 and into a recess 27, this best being illustrated in the sectional view of FIG. 3.

Control means are formed in the control chamber 22 to provide either venting of the chamber or increasing or decreasing the pressure therein to cause axial movement of the slide element 17. The control means of the embodiment illustrated in FIGS. 1 and 5 take the form of the tire valve 23 and the bleed passage 26 and recess 27 for applying input pressure to the control chamber 22 when the valve is in the position shown in FIG. 1.

To cause axial movement of the slide element to the left, as seen in FIG. 5, a lever 28 is pivotally secured to a bracket 29 by means of a pin 30 so that the valve stem 31 can be depressed by a protuberance 32 on the lever 28. This will cause pressure in the control chamber to vent to atmosphere thereby decreasing the pressure on the right hand side of the enlarged diameter portion 20. The inlet pressure to the left on the enlarged diameter portion 19 will urge the slide valve axially to the right as shown in FIG. 5.

The tire valve 23, as shown in FIG. 4, has a valve stem portion 31a which extends into the recess 27, and continues to vent to atmosphere for as long as the lever 28 is depressed. This will cause a slight hissing sound of the pilot valve during depression of the lever. It will be noted that the end cap 24 also is provided with an O-ring about the periphery thereof to form a seal for the control chamber 22.

Figure 7:
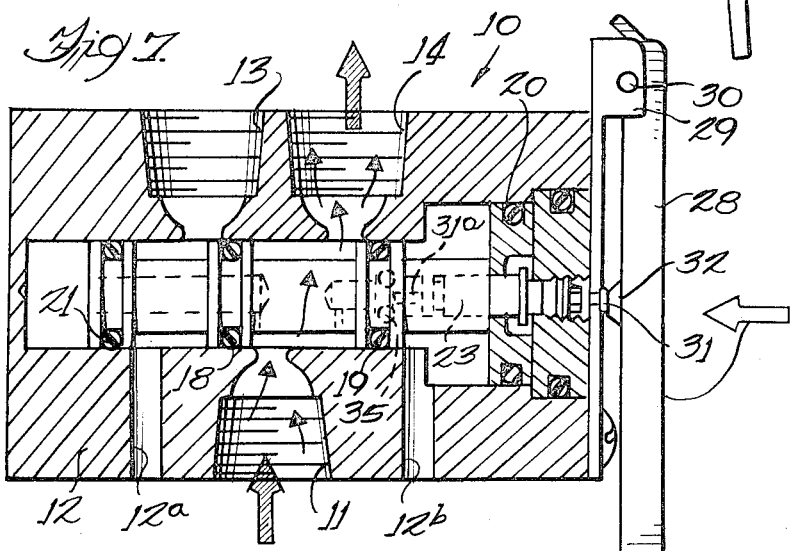
FIG. 7 shows the pilot valve of FIG. 6 in the actuated condition.

To overcome the continuous bleeding, i.e., the hissing sound, of the small amount of pressure within the control chamber 22 via the bleed port 26 and tire valve 23, the pilot valve of this invention is modified as illustrated in FIGS. 6 and 7. Here the recess 27 is provided with a cylindrical sleeve 33 which has an aperture 34 formed therein to be in alignment with the stem portion 31a. An O-ring 35 is positioned between the end of the sleeve 33 and a flange is formed in the recess to receive the O-ring. As the slide member 17 moves axially to the left, as shown in FIG. 7, the stem portion 31a is inserted through the aperture 34 and is embraced by the O-ring 35 to form a seal therewith. Therefore, once the slide element is in its full right hand position as shown in FIG. 7 no further venting of inlet pressure will occur through the tire valve 23 and the hissing sound will stop. Upon releasing the lever 28 the tire valve is closed thereby retracting the stem portion 31a from the O-ring 35 and aperture 34 to allow bleed pressure to pass through the bleed port 26 through the recess 27 and again pressurize the right side of the enlarged diameter portion 20 so that the slide element will move to the full left hand position as shown in FIG. 6.

Figure 8:
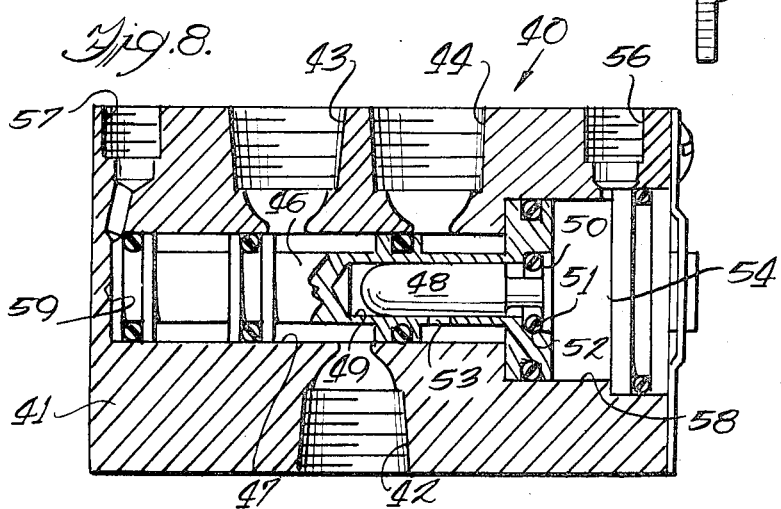
FIG. 8 is still another modified form of the pilot valve of this invention.

Referring now to FIG. 8, an alternate form of pilot valve is constructed in accordance with the principle of this invention and is designated generally by reference numeral 40. Here a valve body 41 is provided with a single inlet 42 and first and second outlets 43 and 44, respectively. A slide element 46 is movable within a cylindrical bore 47 and operates essentially in the same manner as the pilot valve 10 of FIGS. 1 and 6. However, in this instance the slide element 46 is provided with a relief piston valve means 48 movable within a recess 49 of the slide element. The relief piston 48 includes an enlarged diameter head portion 50 which is urged against an O-ring 51 engaged with a flange portion 52. In this instance no bleed port is provided between the interior of the recess and the inlet port 42. However, the outlet port 44 has a bleed port 53 in fluid communication therewith so that back pressure of the outlet 44 will not inadvertently dislodge the slide element 46 to the left. That is, when the slide element 46 is previously in the full right hand position, the head portion 50 of the piston 48 is urged into firm contact with the O-ring 51 by the wall of the end cap 54. When the slide element 46 is urged to the full left hand position, as shown in FIG. 8, back pressure in the outlet port 44 will pass through the bleed port 53 and dislodge the head 50 from the O-ring 51 so as to equalize the pressure on both sides of the enlarged diameter portion at the right end of the slide element. The head 50 will remain in this dislodged condition until such time as the slide element 46 is urged to the full right hand position and abuts against the wall of the end cap 54.

The pilot valve 40 of FIG. 8 is preferably of the type that can be used for controlling hydraulic fluid. Therefore, the valve 40 may be provided with a pair of pilot ports 56 and 57 in fluid communication with the control chamber 58 and an end chamber 59, respectively. When the slide element 46 is to be moved to the full right position, pilot pressure is inserted into the end chamber 59 and the slide element is thus moved axially to the right. It will remain in this position as long as the pressure in the control chamber is maintained sufficiently low so as not to overcome the pressure in the end chamber 59. To shift the slide element 46 to the full left position, as shown on the drawing, pressure is applied to the control chamber 58 through the pilot port 56 and due to the enlarged diameter end portion, less pressure is needed to urge the movable element 46 axially to the left. This pressure also maintains the head 50 in firm contact with the O-ring 51 to seal the chamber. The pilot valve 40 can be operated by maintaining continuous pressure on the pilot port 57 and intermittently operate the pilot pressure at the pilot port 56.

Figure 9:
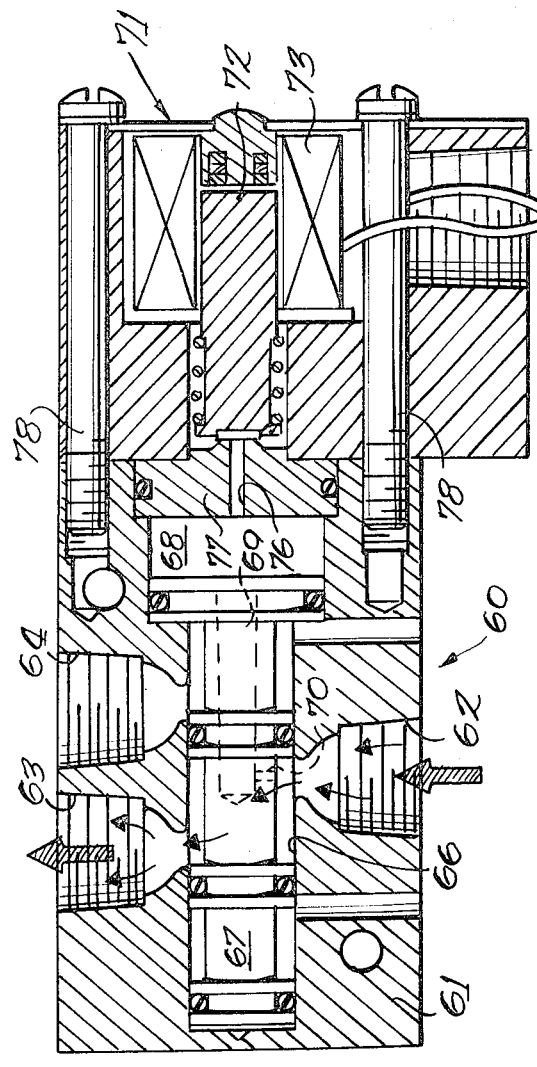
FIG. 9 illustrates a further modified form of the pilot valve of this invention being operated by electrical solenoid means.

Referring now to FIG. 9 there is seen an alternate embodiment of a pilot valve constructed in accordance with this invention and is designated generally by reference numeral 60. The pilot valve 60 includes a valve body 61 having an inlet port 62 selectively to be in fluid communication with one of a pair of outlet ports 63 and 64. A cylindrical bore 66 is formed in the valve body 61 to receive a slide element 67 of substantially the same configuration as the slide element 17 of FIG. 1. Here a control chamber 68 is in fluid communication with the inlet pressure by means of a recess 69 and a bleed port 70. Because of the enlarged diameter of the end portion of the slide element, pressure applied to the control chamber 68 will urge the slide element to the full left position as shown in FIG. 9. The pilot valve 60 is controlled electrically by a solenoid operated plunger mechanism designated generally by reference numeral 71. The solenoid mechanism 71 includes a movable plunger element 72 and an electrical coil 73 positioned thereabout. A pair of energizing leads 74 are connected to a suitable switch and power source for selective energization of the coil 73. This energization will urge the plunger 72 to the right, as seen in FIG. 9, to open an aperture 76 formed in an end cap 77. Therefore, the pressure in the control chamber 68 is bled through the aperture 76 and between the side walls of the plunger 72 and coil 73 to the surrounding atmosphere.

The solenoid mechanism 71 is fastened to the valve body 61 by a pair of threaded screws 78. The pilot valve 60 operates substantially in the same manner as the pilot valve 10 of FIG. 1 except that manual actuation of the tire valve is replaced with electrical actuation of a solenoid mechanism to open the aperture 76 in the end wall 77.

Figure 10:
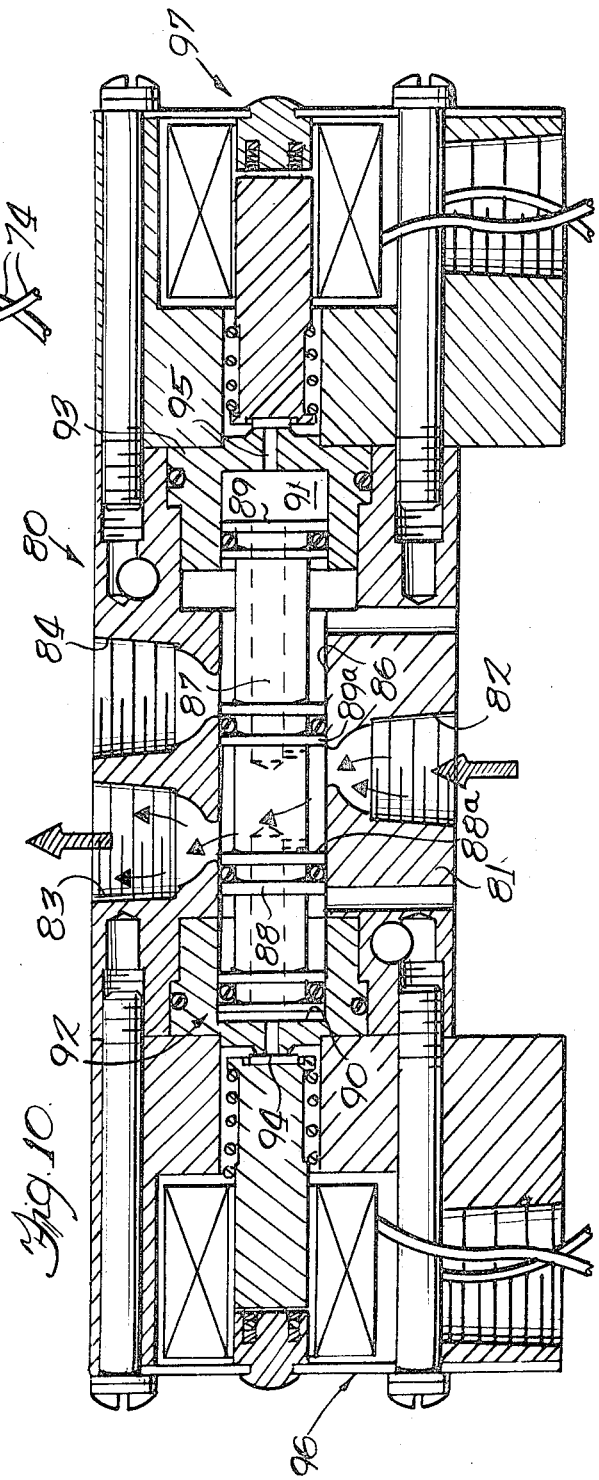
FIG. 10 illustrates a double ended pilot valve similar to that of FIG. 9.

Referring now to FIG. 10 there is seen still another alternate embodiment of a pilot valve constructed in accordance with this invention and is designated generally by reference numeral 80. The pilot valve 80 includes a valve body 81 having an inlet port 82 and a pair of outlet ports 83 and 84. A cylindrical bore 86 is formed in the valve body extending therethrough from end to end to receive a slide element 87. The slide element 87 has enlarged diameter end portions 88 and 89, they being of the same dimensions, in movable relation with a pair of control chambers 90 and 91, respectively. Enlarged diameter central portions 88a and 89a form the shuttle chamber selectively to direct fluid flow from one outlet to the other outlet. A pair of end caps 92 and 93 have apertures 94 and 95, respectively, and a corresponding pair of solenoid operated mechanisms 96 and 97 cooperable therewith. The solenoid mechanisms 96 and 97 are substantially the same as that of the solenoid mechanism 71 of FIG. 9 and no further detailed explanation is needed to understand their operation.

However, the pilot valve 80 of FIG. 10 has the control chambers 90 and 91 thereof formed within elongated end caps rather than formed of cylindrical bore portions in the valve body per se. Recesses and bleed ports extend through the slide element 78 so that inlet pressure can be applied to both of the control chambers. However, when movement of the slide element is required, say for example from left to right as seen in FIG. 10, the solenoid actuator 97 is energized to expose the control chamber 91 to atmosphere thereby causing the pressure in chamber 90 and the pressure at the inlet port 82 to urge the slide element axially to the right. Once the slide element has moved, the solenoid actuator 79 may be deenergized and the slide element will remain in this position. When it is desired to shift the slide element back to the left, solenoid actuator 96 is energized to expose the control chamber 90 to atmosphere via the aperture 94. Therefore, the pilot valves 60 and 80 of FIGS. 9 and 10, respectively, can be actuated remotely simply by closing and opening of switch devices or the like.

While several embodiments of the invention have been disclosed in detail herein, it will be understood that still further variations and modifications of this invention may be effected without departing from the spirit and scope of the novel concepts disclosed and claimed herein.

The invention is claimed as follows:

1. A pilot valve comprising in combination, a valve body having an inlet port and first and second outlet ports selectively to be in fluid communication with said inlet port, a cylindrical bore of a given diameter formed in said valve body, a control chamber formed at one end of said cylindrical bore, said control chamber having a cylindrical configuration concentric with said cylindrical bore, an elongated slide element having first and second spaced apart enlarged diameter portions of substantially said given diameter and positioned in said cylindrical bore and further having a third enlarged diameter portion positioned in said control chamber, said slide element directing fluid flow from said inlet port to said first outlet port when said slide element is in one position and directing fluid flow from said inlet port to said second outlet port when said slide element is in another position, fluid control means operatively connected with said control chamber for changing the pressure therein to cause the fluid pressure at said inlet port to move said slide element in said bore to thereby change the state of fluid flow from said first outlet port to said second outlet port, an end cap secured over said control chamber, a tire valve secured to said end cap and having a movable stem portion extending into said control chamber toward said slide element, a recess formed in said slide element in alignment with said stem portion of said tire valve, and a bleed passage in fluid communication through said slide element into said recess and therefrom into said chamber, whereby movement of said slide element to said another position will cause said stem portion of said tire valve to be inserted into said recess.

2. The pilot valve of claim 1 further including an O-ring positioned in said recess to engage with said stem portion of said tire valve when said slide element is in said another position thereby sealing said bleed passage between said control chamber and said inlet port.

* * * * *